May 20, 1952  E. V. BARKER  2,597,052
FERTILIZER BEATER AND SPREADER
Filed March 2, 1949  3 Sheets-Sheet 2
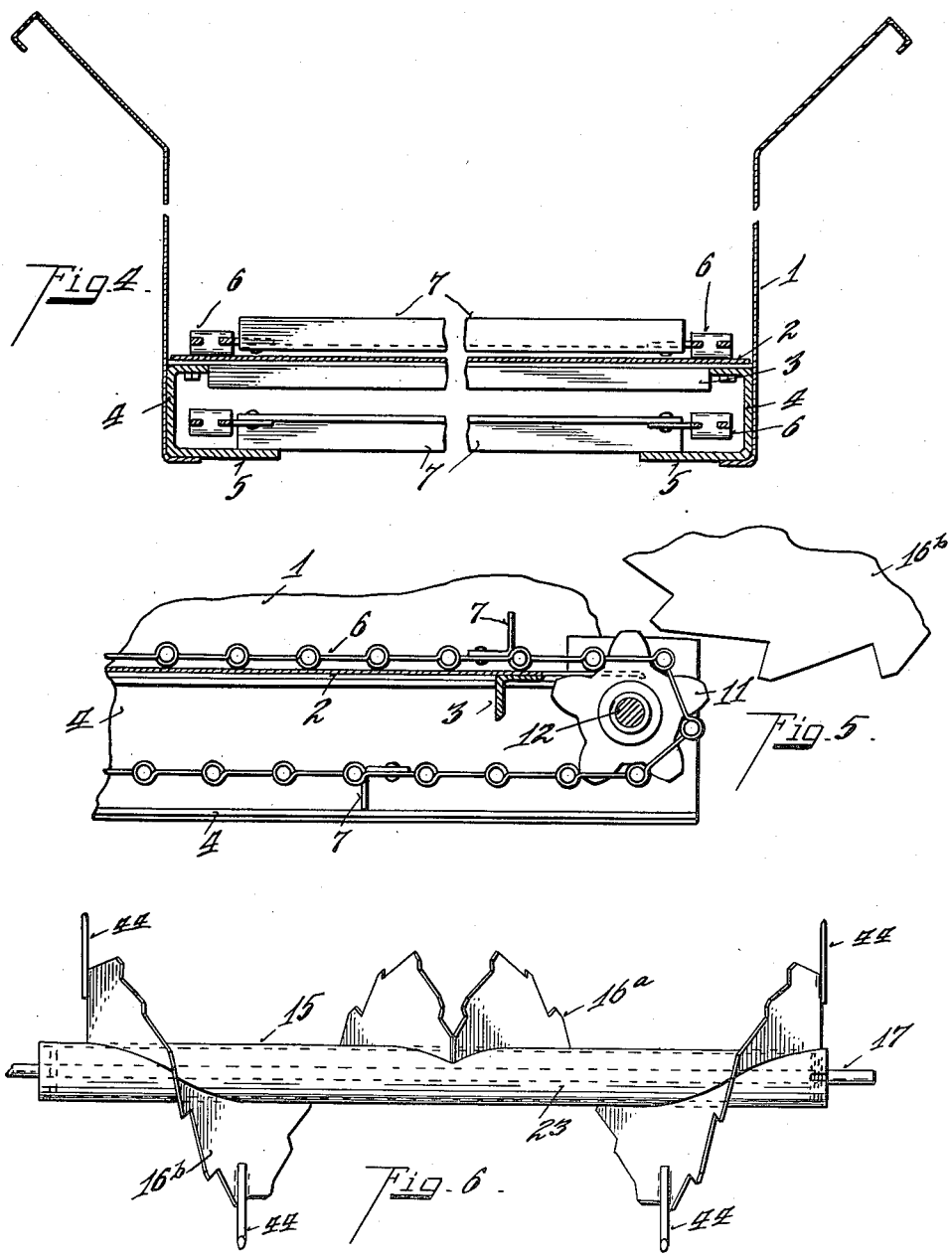

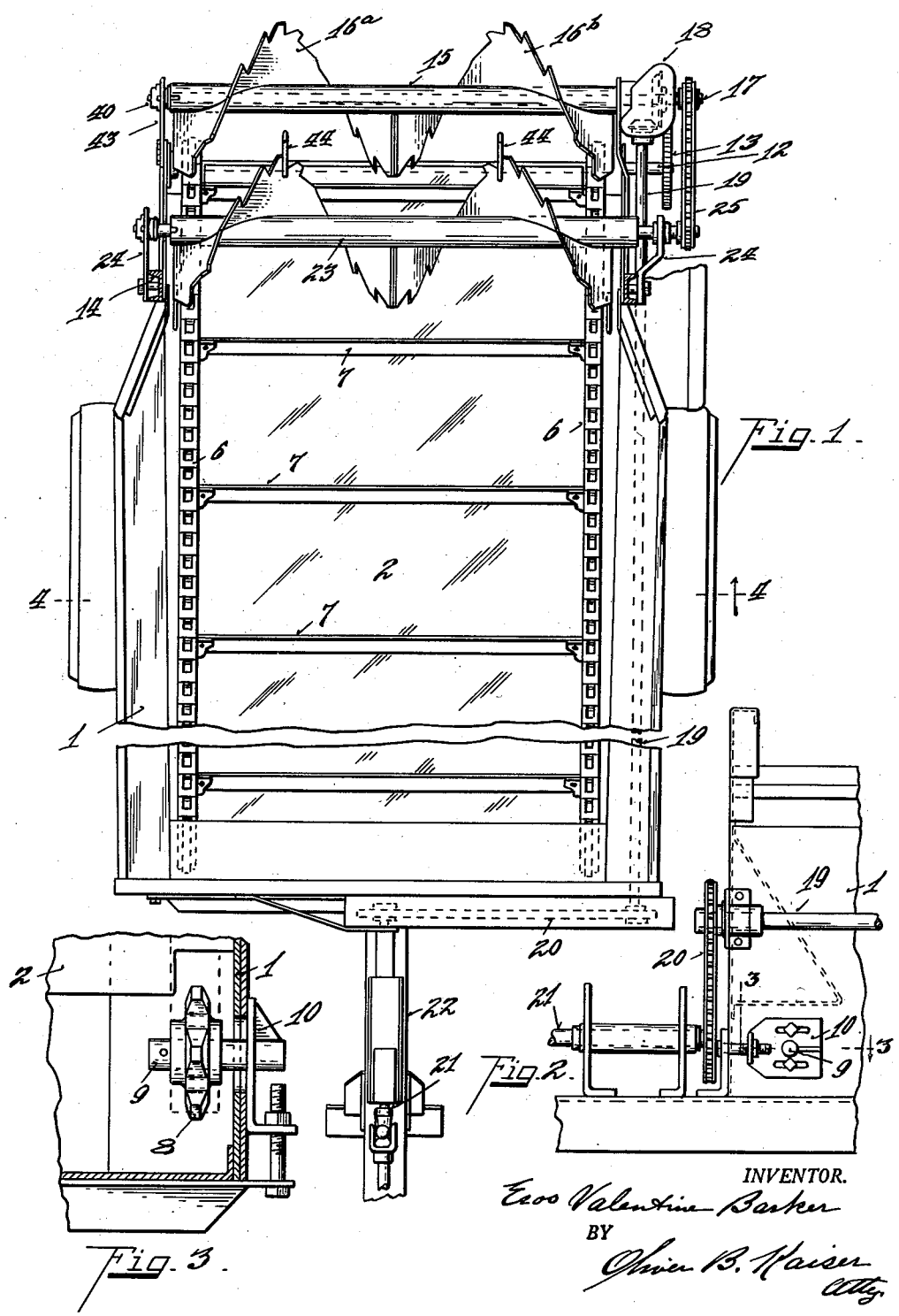

May 20, 1952 E. V. BARKER 2,597,052
FERTILIZER BEATER AND SPREADER
Filed March 2, 1949 3 Sheets-Sheet 3
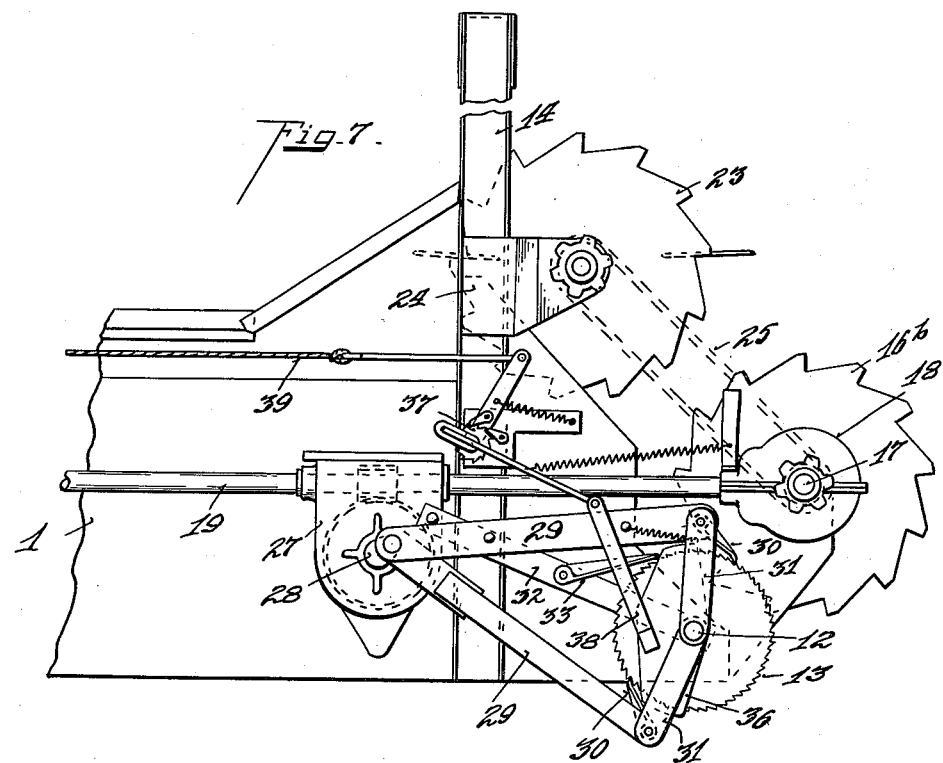
INVENTOR.
Eros Valentine Barker
BY
Oliver B. Kaiser
Atty.

Patented May 20, 1952

2,597,052

UNITED STATES PATENT OFFICE 2,597,052

FERTILIZER BEATER AND SPREADER

Eros Valentine Barker, Galion, Ohio, assignor to The Perfection Steel Body Company, Galion, Ohio, a corporation of Ohio Application March 2, 1949, Serial No. 79,284

1 Claim. (Cl. 275—6)

This invention relates to improvements in a class of vehicles, commonly designated as manure spreaders, for transporting a charge of soil fertilizing material, which in the process of discharge is disintegrated, shredded and distributed in a wide spread from the vehicle.

The invention relates more particularly in effecting the beating and wide spread distribution by a unitary device in substitution of separate beater and wide spread devices successively disposed and the distribution controlled and varied in quantity, as light, heavy and medium by the control of the feeding advance of the material within the vehicle to the unitary beater-spreader, and in providing for the convenient removal of the beater-spreader to convert the vehicle for self-unloading or general service.

Vehicles of this class are preferably produced as of two-wheel trailer type to be coupled to and transported by a tractor and which also furnishes the power for driving the transmission mechanism for the various power operated devices of the unit, in order to be operative and function irrespectively of whether the vehicle is traveling or at rest. This is also of advantage as there is no power consuming drag on the tractor, as in case where the power is obtained through the traction of the vehicle wheels traversing on the ground and to effect different results by changes in rate of speed irrespective of the vehicle traveling rate.

An object of the invention is to provide a rotor as a unitary means for shredding, disintegrating and wide spread uniform distribution of manure from the end of a vehicle body as acted upon and taken from the supply within the vehicle governed and controlled by the degree of advance of a traveling conveyor which feeds the contents of the vehicle body to the rotor, and for convenient removal of the rotor from the vehicle body for use of the vehicle for general service.

Another object is to provide a manure beater and spreader, as a unit, composed of a single helical vane about and extending radially from a tubular arbor or drum, with its spirality oppositely directed from a mid-point of its length for a right and a left helix, or a pair of joined flights of relative equal length and reverse conformity, each of one revolution about the arbor or slightly in excess thereof, with their outer ends in the same axial plane and same side of the axis of the arbor for relative uniformity in action, and wide spread distribution of the material.

The vane to function as a beater and a spreader has its periphery serrated or toothed, the teeth each of a form to provide a radial edge and an angular transverse edge, the radial edge to administer a chopping action upon the material to shred or sever straw or strands within the material and the angular transverse edge for a rasping or scraping action upon the material engaged, for its carriage and dispersion by the vane, induced by centrifugal force.

Therefore another object is to provide a single unit beater and spreader, comprising two oppositely directed helicoid vane flights having a serrated periphery for diversified action upon the material engaged therewith, to divisionally cut the same in the direction of the material advance and to progressively disintegrate the same in a cross-wise direction for a finer and uniform reduction devoid from any peripheral adherence or accumulation of material thereon clogging to its action and for even widespread distribution therefrom.

Another object is to provide a plurality of disintegrating and distributing rotors of duplicate construction and dimension in superposed arrangement, with the upper rotor staggered or in advance of the lower rotor to act upon a high height carriage of material in tiers.

Another object is to provide for a variation of volume distribution for either spot or continuous path spread by the control of the feeding advance of the material within the body of the vehicle and the spot spread effected whether the vehicle is traveling or at rest.

Another object is to provide transmission means for intermittently advancing the material carried by the vehicle body for disintegration and distribution, readily and convenientlly controlled from a remote point convenient to the operator for arresting or regulating the inching degree of material advance.

Various other features and advantages of the invention are more fully set forth in and apparent from the following description of the preferred embodiment as illustrated by the drawings accompanied herewith and forming a part of this specification, in which:

Figure 1 is a top plan view of the vehicle and manure beater and spreaders at its rear end, the vehicle being of a two-wheel trailer type.

Figure 2 is a side elevation of one side of the front end of the vehicle, disclosing the power transmission adapted for a coupling connection with the transmission of a tractor with a portion thereof mounted upon the draft bar extending centrally from the front end of the vehicle body for coupling the same to a draw bar of a tractor.

Figure 3 is an enlarged section on line 3, 3, Figure 2.

Figure 4 is an enlarged section on line 4, 4, Figure 1 of the vehicle body.

Figure 5 is a longitudinal section of the rear end of the base of the body of the vehicle.

Figure 6 is an enlarged side elevation of one of the beater and spreader rotors and specifically the second or upper rotor.

Figure 7 is an enlarged side elevation of one side of the rear end of the vehicle, which carries the transmission for the rotors and conveyor.

Figure 8 is an enlarged side elevation of the frame work of the rear end of the vehicle as the right side and opposite from that shown in Figure 7, illustrating the hinged journal support for one end of the lower rotor with the journal supported therein and end elevation of the rotor.

Figure 9 is an elevation of the end of the rotor drum and driving shaft therein and means for making the coupling connection of the shaft and drum.

Referring to the drawings, 1 indictes the vehicle body, with the floor, opposite longitudinal side walls and front end wall of sheet metal structure. The floor 2 is secured to a plurality of spaced angle iron cross bars 3 (see Figure 4). The cross bars 3 at their opposite longitudinal ends are fixed to a pair of sills 4, each of channel form in cross section, extending longitudinally of the body and relatively at the opposite sides thereof to which the side walls respectively are also fixed and each having its channel inward. The lower flange 5 of each sill is of extended width dimension and jointly provide a pair of rails for sustaining a run of an endless conveyor 6, traversing longitudinally about the floor 2, as above and below the same, with the upper run or span of the conveyor above and traveling upon the floor while the return run or span travels therebeneath and is sustained and traverses upon the lower flanges 5 of the sills.

The conveyor consists of a pair of sprocket chains, one respectively for each of the opposite longitudinal ends of the conveyor and joined at spaced intervals by angle iron cross bars 7, for scrapingly conveying the material loaded in the vehicle body to a discharge end thereof. The chain links are of well-known conventional construction in which the ends of the links are interfittingly pivotally connected.

The chain for the rearward or active run of the conveyor traverses bearingly upon the floor to the relief of the cross bars 7, while for the return run, the laterally extended flanges of each of the cross bars 7, at their opposite ends bear edgewise and traverse upon the lower flanges 5 of each of the sills 4, the sills confining and encasing the same within the base of the body. This is of material advantage as relieving the transmission from carrying any conveyor depressing load weight, particularly for a large load carrying vehicle body as the conveyor extends the full length thereof.

Each chain of the conveyor at the forward end of the body (see Figure 3) is engaged with and about an idler sprocket wheel 8, loosely journalled upon a stud shaft 9, traversing an elongated slot through the sill and side wall of the body and fixed upon and laterally extending from a bracket 10, adjustably mounted upon the exterior side of a wall of the body. This provides ready accessibility for adjusting the tension of the conveyor chain.

The opposite loop ends of the conveyor chains, at the discharge end, (see Figure 5) each, is engaged with and about a respective driving sprocket wheel 11 fixed upon a shaft 12 journalled within suitable bearings in the opposite longitudinal sides of the vehicle body.

One end of the driving shaft 12 fixedly carries a ratchet wheel 13 and the shaft is extended to locate the transmission means exterior of the body. The ratchet wheel comprises an element of the transmission means for intermittently transmitting the conveyor which will be subsequently described and in detail may be considered separate and apart hereof, as various methods may be employed for transmitting the conveyor and its control.

The rear end of the body being open, the side walls thereof for added stability connect with and are joined by an arch frame 14, which extends above the height of the body and is also utilized as a support for journal or bearing brackets for an upper or second disintegrating and distributor rotor.

A material disintegrator and distributing rotor is disposed immediately above and at the discharge end of the conveyor. The rotor is composed of a spiral peripherally toothed or serrated vane, extending cross-wise for approximately the full width of the body. The vane is of sheet metal material, extending radially from and about a tubular arbor or drum 15, and is welded or integrally joined thereto.

The vane preferably consists of a pair of oppositely directed helicoid sections or flights 16a and 16b, of like dimension, meeting at a midpoint or transverse center line of the rotor, each describing one revolution or slightly in excess thereof, with their outer or free ends in the same axial plane and on the same side of the axis of the arbor, for relative uniformity in action. The flights relatively may be designated, respectively, as a right hand and a left hand, the right hand flight 16a for the left half of the rotor and left side of the vehicle body and the left hand flight 16b for the right half of the rotor and corresponding side of the vehicle body, and of a combined length to be effective for the full width of the vehicle body. The two flights are oppositely directed in order to direct the material distributed thereby to both sides of the line of travel and to centrifugally disperse the same rearward of and sidewise from the body of the vehicle for a widespread dispersion and distribution and an even spread thereof. Each flight, preferably, is of one revolution (360°) or slightly in excess of 360 degrees to bring their joined ends slightly beyond the axial plane of the outer ends for acute juncture for a more effective penetration of the material, as the flights also function as beaters to scarf and disintegrate the material in their edgewise engagement therewith. The one revolution provides for a progressively constant and non-variable action upon the material as engaged therewith for each cycle of revolution to minimize the power requirements and avoid impulsive interception with the material retarding or impeding to its rotative cycle, which is injurious to the rotor transmission mechanism. It also is materially effective for variation in volume discharge controlled and governed by the rate of feeding advance of the material to the rotor, as for light, medium or heavy spread of the material.

The serrated periphery of the vane is of saw tooth design, although the teeth function differently than in that of a saw, as they move laterally against the material, so that the entire edge of the tooth is active. The teeth are substantially of uniform dimension and design, each having a radial edge for a lateral action or depth cut into the material to shred and sever straw or strands extending crosswise therein and an angular transverse edge, which joins or terminates with the base or root of the radial edge of an adjoining tooth and slightly short from the head or outer end of its own radial edge for a rasping or scraping action upon the material engaged. The shape of the teeth is such that the material will not become clustered thereon, which would interfere with it being fed back upon the vane, thus possessing a self-cleansing characteristic which is of material advantage.

The rotor is revolved in a direction to move the teeth ascendingly upon the material so that the quantity disintegrated and taken from the bulk urged thereagainst is readily dispersed upwardly and laterally therefrom by the rotative velocity of the rotor for uniform distribution. As each flight of the rotor is of a complete revolution about the arbor, they simultaneously are in continuous and uniform progressive action with the material for a full cycle.

The arbor of the rotor has a shaft 17 concentrically engaged therethrough and removably coupled thereto at one end by one or several coupling disks snugly fitting within the bore of the arbor, in keyed connection therewith and having a central square bore for a coupling connection with the shaft.

The opposite end of the shaft 17 is extended to project into and journalled within a transmission casing 18, housing a pair of intermeshing bevel gears, one fixed upon the end of the shaft 17 and the second upon a shaft 19. The shaft 19 extends longitudinally parallel with a relative side wall of the body to the forward end thereof at which it is suitably bearing supported. The forward end of the shaft 19 carries a sprocket wheel transmitted by an endless sprocket chain 20 in engagement with a sprocket wheel fixed upon the end of a shaft 21, journalled and supported within a suitable bearing mounted upon the hitch tongue or bar 22, extending centrally from the forward end of the vehicle body. The shaft 21 extends longitudinally of the hitch and its forward end is provided for making a coupling connection with the transmission means of a tractor to which the vehicle is transportingly coupled and intervening of its length is equipped with a knuckle or flexible joint. It is obvious and recognized that other means and methods may be employed for supplying the transmitting power for the spreader and conveyor mechanism.

A second disintegrator and distributor rotor 23, designated as an upper rotor, which in structure duplicates the lower rotor is located in a forward off-set and elevated relation from the lower rotor. The transmitting shaft 17 for the upper rotor is journalled in a pair of brackets 24, 24, respectively mounted upon a relative vertical post of the arch frame 14 of the vehicle body. The upper rotor is transmittingly connected with the lower rotor by means of a sprocket chain 25 engaged with sprocket wheel, one respectively upon each of the shafts 17 of the rotors.

The transmission for the conveyor of which the ratchet wheel 13 is an element is in driven connection with the shaft 19, which rotates the beater and spreader rotors, and as illustrated in Figure 7 comprises a worm and worm gear intermeshingly engaged, journalled and housed within a casing 27. The casing 27 is fixed upon the exterior side of a side wall of the vehicle body and is traversed by the drive shaft 19 and upon which the worm within the casing 27 is fixed. The worm gear within the casing 27 is mounted upon and fixed to a crank shaft 28, journalled in said casing having its crank arm exterior thereof which pivotally connects with one end of each of a pair of links 29, 29. The opposite end of each link 29 respectively pivotally carries a pawl 30, and is pivotally connected with one end of a link 31, which has its opposite end pivotally connected upon the conveyor driving shaft 12, and adjacent the outer side of the ratchet wheel 13.

Each pawl 30 is yieldingly urged to maintain its toothed end into contacting engagement with the toothed periphery of the ratchet wheel 13, to intermittently rotate the same in a forward stroke thereof.

The links 29, 29, have their pawl carrying ends respectively disposed relatively at opposite sides of the ratchet wheel and the pawls oppositely directed for action counter to each other and thereby are alternately in active engagement with the teeth of the ratchet wheel. Thus in a forward stroke of the links 29, 29, which by their common connection with the crank shaft 28 are reciprocated in unison, the upper pawl is active to move the ratchet wheel, while the lower or second pawl is retracted, and in the reverse stroke of the links, the lower pawl is active while the upper pawl is retracted.

A tie link 32, at one end is rigidly fixed to the transmission casing 27 and its opposite end in bearing connection with the conveyor driving shaft 12 serving to stabilize the conveyor transmission mechanism.

Reverse rotation of the ratchet wheel is locked by a latching pawl 33, pivotally mounted upon and extending from the tie link 32.

The degree of ratchet wheel rotation can be varied or regulated within the maximum length of stroke movements of the pawls administered by a cam lever 36, pivotally mounted upon the conveyor drive shaft 12, which limits and governs the activity of the pawls for engagement with the ratchet wheel in their stroke movements. The cam lever at its opposite ends extends laterally to overlap the periphery of the ratchet wheel 13 to be respectively engaged by the pawls 30, 30, to lift or elevate the same from the ratchet wheel for a determined degree of its stroke. The pawls thereby can be controlled to be either active or inactive for a full or partial stroke and thereby control and vary the degree of feeding advance of the conveyor or to neutralize the same.

The conveyor transmission provides for a variable speed control as for continuous travel of the conveyor, intermittent in various degrees or to idle the same and independent of the tractor travel speed. Therefore it is possible to obtain a light, medium or heavy spread of manure regardless of whether the tractor is moving fast or slow, or working on hard, soft, dry or slippery ground. The movement of the conveyor can be readily arrested by shifting the cam lever 36 to hold the pawls out of engagement with the ratchet wheel for their full stroke movements, so that the manure can be spot spread and in relative different quantities whether the vehicle is traveling or at rest, as the unloading and spreading mechanisms are operated by power direct from the tractor and independent of the vehicle travel and the conveyor control is operated from the tractor seat therefore under direct control by the driver of the tractor.

The postion of the cam lever in the present instance is remotely controlled and regulated by ratchet means 37, mounted upon the vehicle body and in crank and link connection with an arm 38 extending from the cam lever 36. The ratchet means 37 has a pull cord 39 in coupling connection therewith, the cord extending forward of the vehicle body for manipulating grasp by the driver of the tractor to which the spreader is coupled. The ratchet mechanism with each forward stroke or pull of the cord, rotatively advances the crank thereof in step degrees, correspondingly swinging the cam lever 36 in a forward and reverse direction in a rotative cycle of the crank, moving and setting the cam to a controlling or regulating position of either preventing engagement of the pawls 30, 30, with the conveyor transmitting ratchet wheel 13 or time of connection therewith in a forward or power stroke governed by the number of teeth alloted within the stroke movement of the pawls. The feed thus can be readily controlled, either arrested or the degree of its inching movement regulated by one or several pulling strokes of the cord.

The vehicle for spreading manure requiring but a minium use, it is desirable that the beater-spreader rotors be readily removable to render the vehicle available for general service or for self-unloading the contents therein. The rotors are readily removed by releasing one of the side bearing supports or brackets which permits each rotor, respectively to be withdrawn from its supporting and driving shaft without disturbance to the transmission mechanism.

The shaft 17 for the lower rotor, for one end, as that opposite from the end connecting with the transmission mechanism is journalled within a sleeve bearing housing 40, encasing a sleeve journal traversed by the shaft. The head end of the bearing housing or journal box 40, is provided with a pair of aligned latching lugs or studs 41, extending radially from its periphery and adapted by a slight rotative adjustment of the housing to be brought into registry with a pair of diametric notches 42, leading radially from the bearing housing receiving bore in the supporting bracket 43. The journal supporting bracket 43, being of a leaf type, is hingedly mounted upon the side frame of the vehicle body to permit it to be swung outward to release the same from the journal housing 40, for removal of the rotor endwise from the shaft 17. The latching studs 41 when moved out of registry with the notches 42 bind the journal box of the bracket. For the upper rotor, the right hand bearing supporting bracket 24, bolted upon the stanchion 14 is removed.

After the rotors have been removed the supporting brackets can be replaced to sustain the shafts which need not be removed.

The upper beater and spreader rotor is provided with a plurality of tines 44, fixed or welded to and projecting radially from the vane or flights, one at the outer end of each flight and a second intermediate of its length, as an additional facility of extensive reach to drag the material advancingly toward the rotor. The provision of a pair of superposed rotors accommodates for high stacked loads within the vehicle body and avoids any care as to even or uniform loading and also eliminates the employment of any retarding means or shields generally embodied in manure spreaders.

Having described my invention, I claim:

A fertilizer disintegrator and distributor rotor for installation to a vehicle body cross-wise of a discharge end thereof for direct action upon the fertilizer material within the vehicle body as advanced to the rotor to shred and distribute the material from the vehicle body, comprising an arbor, a helical vane fixed to and about the arbor longitudinally thereof and extending diametric therefrom, the vane subdivided into a pair of oppositely directed flights of like dimension, each describing a complete revolution with the inner end of each thereof radially aligned and joined to form a common medial leading edge extending radially from the arbor, the vane for each flight length having a toothed periphery which acts upon the material delivered thereagainst, each tooth in line with the spirality of the section of the vane from which it extends and in plane therewith having a radial edge and a transverse angular edge in relief from the head end of the radial edge with which it joins and directioned toward the outer end of its respective flight.

EROS VALENTINE BARKER.

REFERENCES CITED

The following references are of record in the file of this patent:

UNITED STATES PATENTS

| Number | Name | Date |
|---|---|---|
| 69,373 | Taylor et al. | Oct. 1, 1867 |
| 712,581 | Oppenheim et al. | Nov. 4, 1902 |
| 789,254 | Campbell | May 9, 1905 |
| 982,330 | Whitely et al. | Jan. 24, 1911 |
| 1,838,755 | Gamble | Dec. 29, 1931 |
| 1,877,966 | Raisbeck | Sept. 20, 1932 |
| 1,879,114 | Crumb et al. | Sept. 27, 1932 |
| 2,015,245 | Swanson | Sept. 24, 1935 |
| 2,066,862 | Synck | Jan. 5, 1937 |
| 2,144,361 | Butter et al. | Jan. 17, 1939 |
| 2,221,266 | Roach | Nov. 12, 1940 |
| 2,274,481 | Johnston | Feb. 24, 1942 |
| 2,340,810 | Hoffstetter | Feb. 1, 1944 |
| 2,342,837 | Brown | Feb. 29, 1944 |